June 19, 1923.                    1,459,543
J. M. McDONALD
AIR VALVE AND THE LIKE
Filed June 27, 1921
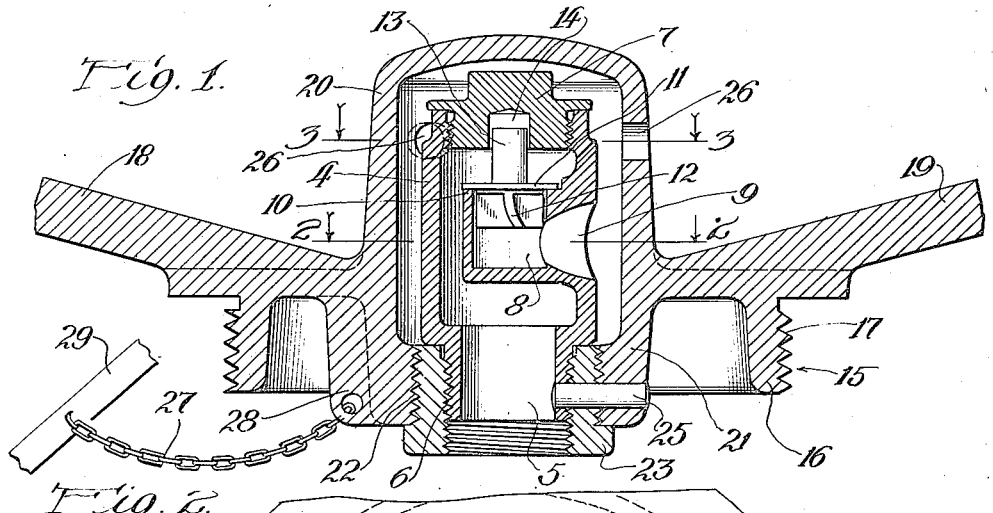
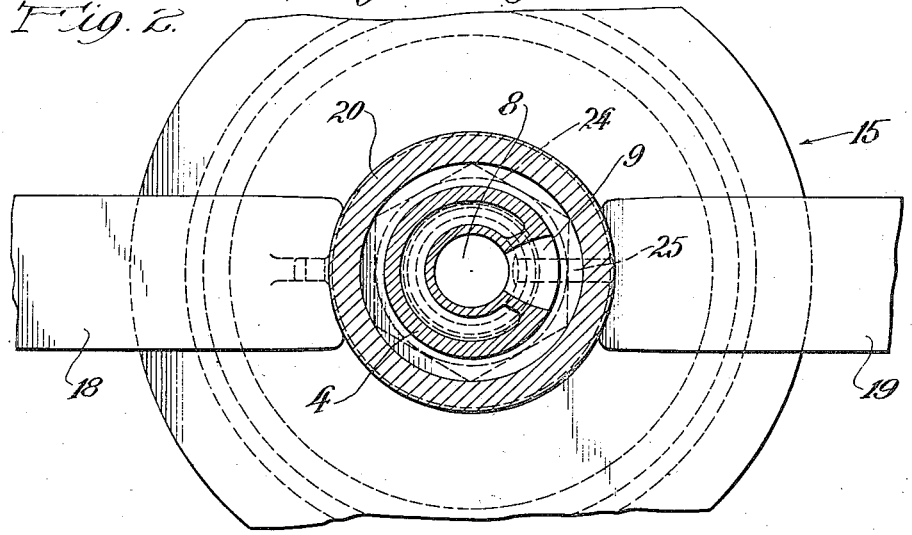
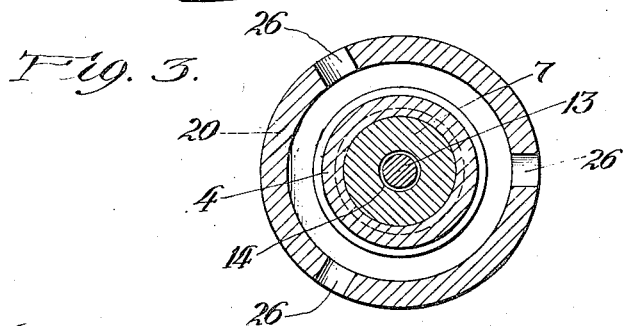
Witness:
Stephen J. Webora
Inventor:
John M. McDonald,
by Lanning & Lanning
Atty's Patented June 19, 1923.

1,459,543

UNITED STATES PATENT OFFICE.

JOHN M. McDONALD, OF DUBUQUE, IOWA, ASSIGNOR TO A. Y. McDONALD MFG. CO., OF DUBUQUE, IOWA, A CORPORATION OF IOWA.

AIR VALVE AND THE LIKE.

Application filed June 27, 1921. Serial No. 480,856.

*To all whom it may concern:*

Be it known that I, JOHN M. McDONALD, a citizen of the United States, residing at Dubuque, in the county of Dubuque and State of Iowa, have invented certain new and useful Improvements in Air Valves and the like, of which the following is a specification.

This invention has to do with certain improvements in air valves and the like. It has particular reference to air valves for use in connection with tank wagons and other containers; although it will appear that the features of the invention may also be used with advantage in connection with other structures. Nevertheless, the construction herein disclosed has been devised with particular reference to the conditions and requirements existing in tank wagons and other similar oil and fuel carriers.

The main object of the invention is to provide an air valve or valves of such construction as to permit the air to enter or leave the tank with sufficient facility to not interfere with a proper withdrawal of the liquid contents from the tank. Nevertheless, it is an object to ensure a sufficiently tight arrangement to prevent an excessive loss of the oil or other liquid contents by evaporation, etc.

Another object of the invention is to so construct the air valve or valves that the brass or copper portions thereof will be effectively enclosed and locked in place, so that they cannot be stolen except by stealing the cap structure itself. This is an important feature, since on account of the relatively high price of copper and brass these parts are subject to frequent loss by theft.

Another object of the invention is to provide a very simple arrangement and one in which the cap is adapted to receive a valve structure of either the so called simplex, duplex or triplex type. The so-called simplex valve is one in which the air is allowed to enter the tank as the liquid contents are withdrawn, while preventing the back flow of air or vapor from the tank. The so-called duplex type of valve permits the air to enter the tank as the liquid and contents are withdrawn, and also permits the air or vapor to find an exit from the tank when the pressure becomes excessive, owing, for example, to expansion or vaporization of the contents with rise in temperature.

Another object of the invention is to very thoroughly protect the valve member itself against the elements, so that rain, sleet, snow, ice, etc., cannot reach the movable valve member. This is a very important feature since in many cases the valve members will otherwise become frozen and not function properly without special attention.

Another object of the invention has to do with the form of the cap itself. In this connection an object is to provide a practically integral cap structure having the necessary chamber for the reception of the valve member, and also having the arms whereby the cap is manipulated for either insertion or removal.

Another object of the invention is to provide means in conjunction with the cap for attaching it to the tank itself in such manner that when the cap is unscrewed it will not fall away from the tank, unless by special operation of the user.

Other objects and uses will appear from a detailed description of the same, which consists in the features of construction and combinations of parts hereinafter described and claimed.

Referring to the drawing:

Figure 1 shows a vertical cross section through a cap and valve embodying the features of the present invention;

Fig. 2 shows a horizontal cross section taken on the line 2—2 of Fig. 1, looking in the direction of the arrows; and Fig. 3 shows a horizontal cross section taken on the line 3—3 of Fig. 1, looking in the direction of the arrows.

The cap herein illustrated is provided with a so-called simplex valve which permits the air to flow into the tank as the contents are withdrawn, but it will be understood that either the duplex or triplex types may also be used if desired.

The simplex valve includes a cylindrical body 4 whose lower end 5 is somewhat contracted to form a neck which is threaded as at 6. The top end of the body 4 is normally closed by a removable cap 7 threaded in place.

Inwardly projecting into the central portion of the body is an air inlet chamber 8 which communicates with the space outside of the body 4 by means of a passage 9. The upper end of the chamber 8 is provided with a horizontal valve seat 10 upon which normally rests a circular disk valve 11. The lower portion of this disk valve is provided with a series of downwardly depending lugs 12 which work within the chamber 8 and serve to guide the valve in its movements. On its upper end the valve may also be provided with a lug 13 which works within a socket 14 in the bottom of the cap 7.

With this simplex valve as soon as the suction within the chamber 4 becomes sufficient, the air on the outside will raise the valve 11 and flow into the chamber 4 and downwardly through its neck 5. The cap is designated in its entirety by the numeral 15. It is of circular form having the downwardly depending flange 16 which is threaded as at 17 to engage the threads of the opening of the tank wagon or other container. The cap may be provided with a pair of integral handles 18 and 19 by means of which it may be easily rotated for either attachment or detachment. In this central portion said cap has an upwardly extending housing 20 of size and shape to enclose the valve while leaving a sufficient clearance all around the valve to permit the air to freely circulate. In its lower central portion the cap has a downwardly depending flange 21 which serves as a downward continuation of the housing.

The lower end of the flange 21 is threaded as at 22 to receive a bushing 23 which is shown as having the hexagonal lower end 24, (see Fig. 2). This bushing has its central passage threaded to receive the threads of the neck of the valve. The exterior of the bushing is sufficiently large to extend beyond the valve member, so that after the neck of the valve has been threaded into the bushing, the valve may be set up into the housing and the bushing threaded into the downwardly depending flange 21, as shown in Fig. 1.

It will sometimes be desirable to lock the valve and the bushing to the cap after they are set into place. This may be readily done by drilling a hole through the flange 21, bushing 23 and neck 5, and then riveting all three of these elements together by a pin 25.

The cap 20 is provided with one or more vent openings 26 through which the air circulates as clearly shown in Fig. 3.

In order to prevent the cap from falling away from the tank after it has been unthreaded, I have shown the chain 27 having its inner end connected to a lug 28 of the cap and its outer end connected to a cross bar 29. Said cross bar when used should be of a length somewhat greater than the diameter of the tank opening, so that after it has dropped down through the opening, it will not pull out except by special manipulation on the part of the operator.

While I have herein shown and described only a single embodiment of the features of my present invention, still I do not limit myself to said embodiment except as I may do so in the claims.

I claim:

1. In a device of the class described, the combination of a cap having a downwardly depending exteriorly threaded flange adapted to thread into the opening of a tank, an integrally formed radially extending arm for turning said cap, an upwardly extending housing in the central portion of the cap and between the arms, and having a vent opening, a downwardly depending flange in conjunction with said housing serving to provide therewith a valve chamber, an inturned interiorly threaded shoulder portion on the lower end of said flange, a bushing threaded into said shoulder, said bushing also being interiorly threaded, a cylindrical valve member having a downwardly depending neck adapted to thread into the bushing, said valve member being smaller in diameter than the opening in the shoulder portion of the flange of the cap, and a rivet extending through the neck of the valve, through the bushing, and through the flange of the cap, substantially as described.

2. In a device of the class described, the combination of a cap having a downwardly depending exteriorly threaded flange adapted to thread into the opening of a tank, a pair of arms for turning said cap, an upwardly extending housing in the central portion of the cap, a plurality of vent openings, a downwardly depending flange in conjunction with said housing serving to provide therewith a valve chamber, an inturned interiorly threaded shoulder portion on the lower end of said flange, a bushing threaded into said shoulder, said bushing also being interiorly threaded, and a cylindrical valve member having a downwardly depending neck adapted to thread into the bushing, said valve member being smaller in diameter than the opening in the shoulder portion in the flange of the cap, substantially as described.

3. In a device of the class described, the combination of a cap having a downwardly depending exteriorly threaded flange adapted to thread into the opening of a tank, an upwardly extending housing in the central portion of the cap having a vent opening, a downwardly depending flange in conjunction with said housing serving to provide therewith a valve chamber, an inturned interiorly threaded shoulder portion on the lower end of said flange, a bushing threaded into said shoulder, said bushing also being interiorly threaded, and a cylindrical valve member having a downwardly depending neck adapted to thread into the bushing, said valve member being smaller in diameter than the opening in the shoulder portion of the flange of the cap, substantially as described.

4. In a device of the class described, the combination of a cap adapted to be removably attached to a tank, an upwardly extending housing in the central portion of the cap having a vent opening, a downwardly depending flange in conjunction with said housing serving to provide therewith a valve chamber, an inturned interiorly threaded shoulder portion on the lower end of said flange, a bushing threaded into said shoulder, said bushing also being interiorly threaded, a cylindrical valve member having a downwardly depending neck adapted to thread into the bushing, and means for securing the neck of the valve, the bushing, and the flange of the cap together against rotation, substantially as described.

5. In a device of the class described, the combination of a cap adapted to be attached to a tank, an upwardly extending housing in the central portion of the cap having a plurality of vent openings, a downwardly depending flange in conjunction with said housing serving to provide therewith a valve chamber, an inturned interiorly threaded shoulder portion on the lower end of said flange, a cylindrical valve member of size suitable to enter within said chamber, and means for securing the lower portion of said valve member to the downwardly depending flange aforesaid, substantially as described.

JOHN M. McDONALD.